(12) United States Patent
Ryu et al.

(10) Patent No.: US 9,529,796 B2
(45) Date of Patent: Dec. 27, 2016

(54) APPARATUS AND METHOD FOR TRANSLATION USING A TRANSLATION TREE STRUCTURE IN A PORTABLE TERMINAL

(75) Inventors: Hyung-Sun Ryu, Yongin-si (KR); Kil-Su Eo, Yongin-si (KR); Young-Cheol Kang, Namdong-gu (KR); Byeong-Yong Jeon, Namdong-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 13/601,878

(22) Filed: Aug. 31, 2012

(65) Prior Publication Data

US 2013/0060559 A1  Mar. 7, 2013

(30) Foreign Application Priority Data

Sep. 1, 2011  (KR) ........................ 10-2011-0088443

(51) Int. Cl.
 *G06F 17/28* (2006.01)
 *G06F 17/30* (2006.01)

(52) U.S. Cl.
 CPC .................................. *G06F 17/289* (2013.01)

(58) Field of Classification Search
 CPC .................................. G06F 17/28; G06F 17/30
 USPC ............ 704/235, 246, 257, 270.1, 277, 1–9
 See application file for complete search history.

(56) References Cited

U.S. PATENT DOCUMENTS 6,266,642 B1 * 7/2001 Franz .................... G06F 17/271
 704/257
6,996,520 B2    2/2006 Levin
7,593,843 B2 * 9/2009 Aue .................... G06F 17/2881
 704/2
7,631,343 B1 * 12/2009 Bennett .................. G06F 17/24
 726/2
7,873,508 B2 * 1/2011 Chino ................. G06F 17/2755
 704/2
8,635,059 B2 * 1/2014 Estelle ................. G06F 17/277
 704/2

(Continued)

FOREIGN PATENT DOCUMENTS

EP   1835417 A1   9/2007
JP   5054063      3/1993

(Continued)

OTHER PUBLICATIONS

Extended European Search Report dated Jul. 6, 2015 in connection with European Patent Application No. 12827609.4; 6 pages.

(Continued)

*Primary Examiner* — Pierre-Louis Desir
*Assistant Examiner* — Seong Ah A Shin (57) ABSTRACT

A method for translation using a translation tree structure in a portable terminal includes inputting, by a user speaking in a first language, one or more first language words to a first portable terminal; translating the inputted first language words into one or more second language words using a database of the first portable terminal; displaying the translated second language words according to the translation tree structure; selecting one of words of the second language words displayed in the translation tree structure; and transmitting the selected second language words to a server and a second portable terminal which uses the second language.

11 Claims, 8 Drawing Sheets

(56) References Cited

U.S. PATENT DOCUMENTS

| | | | |
|---|---|---|---|
| 8,694,303 B2* | 4/2014 | Hopkins | G06F 17/2818 704/2 |
| 8,775,165 B1* | 7/2014 | Oikawa | G06F 17/241 704/10 |
| 2003/0023423 A1 | 1/2003 | Yamada et al. | |
| 2004/0260532 A1* | 12/2004 | Richardson | G06F 17/2836 704/2 |
| 2005/0060160 A1 | 3/2005 | Roh et al. | |
| 2005/0071152 A1* | 3/2005 | Morimoto | G06F 17/2765 704/10 |
| 2006/0149557 A1* | 7/2006 | Kaneko | G06F 17/273 704/277 |
| 2006/0224378 A1* | 10/2006 | Chino | G06F 17/2872 704/2 |
| 2007/0244687 A1* | 10/2007 | Mizutani | G06F 17/289 704/1 |
| 2008/0133245 A1* | 6/2008 | Proulx | G06F 17/2818 704/277 |
| 2008/0208597 A1* | 8/2008 | Chino | G10L 15/1822 704/277 |
| 2010/0274839 A1 | 10/2010 | Chiu et al. | |
| 2011/0077933 A1* | 3/2011 | Miyamoto | G06F 17/289 704/2 |
| 2011/0184722 A1* | 7/2011 | Sneddon | G06F 17/289 704/7 |
| 2011/0320468 A1* | 12/2011 | Child | G06F 17/2223 707/756 |
| 2012/0323554 A1* | 12/2012 | Hopkins | G06F 17/2818 704/2 |
| 2013/0226553 A1* | 8/2013 | Ji | G06F 17/2818 704/2 |
| 2014/0365200 A1* | 12/2014 | Sagie | G06F 17/289 704/2 |

FOREIGN PATENT DOCUMENTS

| | | |
|---|---|---|
| JP | 11120176 | 4/1999 |
| JP | 2003-167875 | 6/2003 |
| KR | 20020034639 A | 5/2002 |
| KR | 20040065468 A | 7/2004 |
| KR | 20050027298 A | 3/2005 |
| KR | 20070058950 A | 6/2007 |
| KR | 20080052282 A | 6/2008 |
| KW | 10-2011-0031274 | 3/2011 |

OTHER PUBLICATIONS

International Search Report dated Feb. 25, 2013 in connection with International Patent Application No. PCT/KR2012/006955, 3 pages.
Written Opinion of International Searching Authority dated Feb. 25, 2013 in connection with International Patent Application No. PCT/KR2012/006955, 5 pages.

* cited by examiner

APPARATUS AND METHOD FOR TRANSLATION USING A TRANSLATION TREE STRUCTURE IN A PORTABLE TERMINAL

CROSS-REFERENCE TO RELATED APPLICATION(S) AND CLAIM OF PRIORITY

The present application is related to and claims the benefit under 35 U.S.C. §119(a) to a Korean Patent Application filed in the Korean Intellectual Property Office on Sep. 1, 2011 and assigned Serial No. 10-2011-0088443, the entire disclosure of which are hereby incorporated by reference.

TECHNICAL FIELD OF THE INVENTION

The present invention generally relates generally to computing devices, and more particularly, to an apparatus and method for translation using a translation trees structure in a portable terminal.

BACKGROUND OF THE INVENTION

In the globalized world, it may be advantageous to use diverse languages to communicate. In response to this, people of various groups are learning foreign languages. In many cases however, considerable time and effort may be required to acquire knowledge of foreign languages, and the necessary training may differ depending on the life environment or the working environment of the individual. In this regard, a system for automatically translating a native language to a foreign language or vice versa has been developed, such that the individual may use various foreign languages like his/her native language without having to learn the foreign language.

However, a conventional automatic translation system may be limited because of ambiguity of the language. Specifically, one word, such as a homonym, may have different meanings; thus, the conventional translation system may not accurately reflect the homonym and thus translate into the uniform meaning registered in advance.

In addition, while new words not yet registered to the dictionary are created over time, a database updated with the new words may not be built up, thus, falling behind ever-changing use of a particular language.

Further, since the word class and the meaning of the translated language are not displayed, a user unfamiliar with the corresponding foreign language cannot make sure whether the foreign language is correctly translated.

SUMMARY OF THE INVENTION

To address the above-discussed deficiencies of the prior art, it is a primary aspect of the present invention to provide translation apparatus and method using a translation tree structure in a portable terminal for marking word class and meaning of homonyms together with a translated sentence in the tree structure so that a user unfamiliar with a foreign language can identify whether or not the translation is accurate.

Another aspect of the present invention is to provide a translation apparatus and method using a translation tree structure in a portable terminal for providing convenience to a user by translating words stored to a user database and a common database according to priority.

Yet another aspect of the present invention is to provide translation apparatus and method using a translation tree structure in a portable terminal for receiving a translation revision function by requesting a recipient who uses the translated foreign language to revise the translation.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computing device. The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
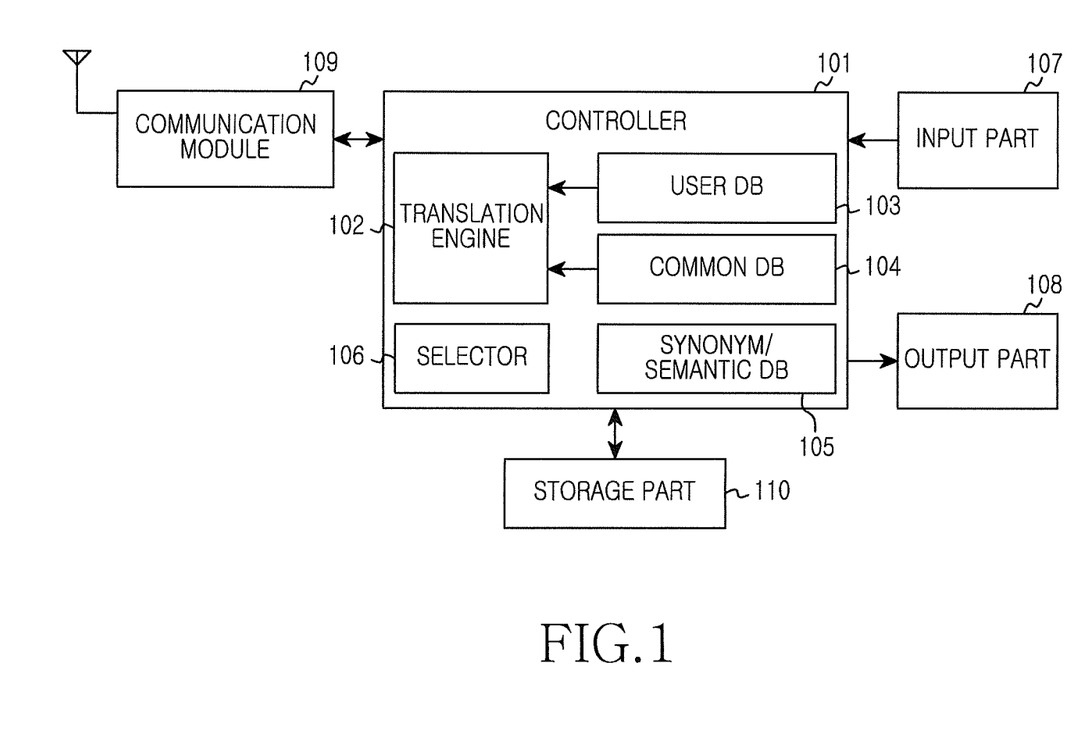
FIG. 1 illustrates an example translation apparatus using a translation tree structure in a portable terminal according to an embodiment of the present invention.

The present invention may be implemented in an electronic device including a portable terminal such as, for example, a smart phone and a mobile telecommunication terminal. Hereunder, a portable terminal is used as an example for the electronic device. 4 FIG. 1 illustrates an example translation apparatus using a translation tree structure in a portable terminal according to an embodiment of the present invention. As shown in FIG. 1, the translation apparatus using the translation tree structure in the portable terminal can include a controller 101, a translation engine 102, a user database (DB) 103, a common DB 104, a synonym/semantic DB 105, a selector 106, an input part 107, an output part 108, a communication module 109, and a storage part 110.

The controller 101 controls operations of the portable terminal. The controller 101 can include the translation engine 102, the user DB 103, the common DB 104, and the synonym/semantic DB 105.

The translation engine 102 requests data used for the translation by the translation engine, the user DB 103, and the common DB 104, and translates an input sentence comprising one or more words using the requested data. For example, the translation engine 102 translates first input language words into one or more second language words using a DB pre-stored in a first portable terminal. When the first input language words are not pre-stored in the DB of the first portable terminal, the translation engine 102 translates the first input language words into the second language words using a translation engine DB. In certain embodiments, the translation engine translates using the DB stored in the user DB 103 first, and using the DB pre-stored to the common DB 104 when the user DB 103 does not store the second language. When both of the user DB 103 and the common DB 104 do not store the first language, the translation engine 102 translates using the DB stored therein.

The user DB 103 stores a translation DB inputted by a user in person. For example, when the translation using the common DB 104 or the DB stored in the translation engine 102 is not desired by the user or mistranslated with incorrect meaning, the user can input and store the translation manually. The stored translation DB is saved in the user DB 103. When the user manually performs the translation, the data stored in the user DB 103 is used according to the priority of DBs in the system.

The common DB 104 is downloaded from the DB stored on a server and then stored by the user. For example, the data stored in the user DB 103 is transmitted to the server in which the server, receives, updates, and stores data for various users in real time. The data updated in real time can be downloaded to multiple users, and the downloaded data may be stored in the common DB 104. As stated earlier, the data stored in the common DB 104 is given the second priority after the user DB 103, and the common DB 104 transmits the data to the translation engine 102.

The synonym/semantic DB 105 includes a dictionary DB that stores synonyms or meanings of the first language and/or second language words. For example, the synonym/semantic DB 105 marks the homonyms of the sentence of the first input language words with the word class and the meaning of the first language words according to the tree structure, and subsequently sends them to the output part 108.

The selector 106 selects any one of translations displayed in the translation tree structure according to the user's input. For example, the selector 106 selects one of words of the second language words displayed in the translation tree structure. When the second language word is selected, the selector 106 selects either the selected second language word or the unselected second language word.

Through the input part 107, the user may input a sentence. For example, a user using the first language inputs the first language words, and inputs the second language word not pre-stored to the translation engine DB among the second languages word displayed.

The output part 108 outputs the sentence inputted by the user and the translated sentence or message received from the communication module 109. For example, the output part 108 displays the translated second language words in the translation tree structure, and displays the second language words translated using the translation engine DB according to the translation tree structure.

The communication module 109 transmits the translation data selected by the user and receives translation data from a sender. For example, the communication module 109 transmits the selected second language words to the server and the second portable terminal using the second language, transmits the selected second language words and the unselected second language word displayed in the translation tree structure to the second portable terminal, receives the word selection, and transmits the revision request result to the first portable terminal.

The storage part 110 can include a program storage part for storing an executable program for controlling the portable terminal, and a data storage part for storing data generated by the program's execution.

As constructed, the controller 101 can perform the functions of the terminal. The components are separately provided to distinguish their functions. Accordingly, in the actual implementation, the controller 101 can process all or part of the functions of the terminal.

Figure 2:
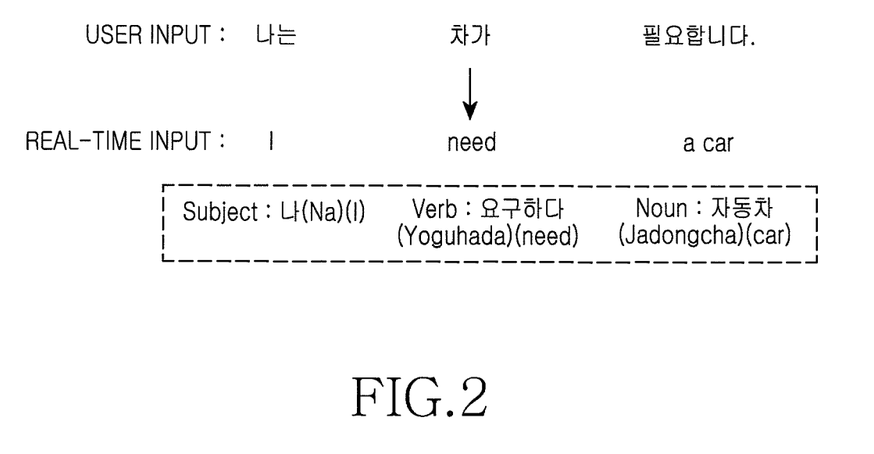
FIG. 2 illustrates an example real-time translation according to an embodiment of the present invention.

FIG. 2 illustrates an example real-time translation according to an embodiment of the present invention. In this example, it is assumed that a Korean-speaking user wants to translate a particular Korean sentence into English. That is, the user knows the accurate sentence in Korean but cannot translate it into English, or can roughly translate it into English but requires an accurate translation. As shown in FIG. 2, the user inputs the Korean sentence to be translated into English, to the input part. Next, when the user inputs a command to change (translate) the input Korean into English, the user's intended sentence is automatically translated in English. That is, when the sentence " 나는 차가 필요합니다 " is inputted and then the command for changing into English is inputted, the sentence is translated into English "I need a car" in real time. According to certain embodiments, the feedback on the word class and the synonym of the inputted word may be provided so that the user can identify whether the translation is processing as intended. More specifically, the user may receive the feedback informing that the personal pronoun "I" corresponds to the " 주어 " in the input sentence and its meaning corresponds to the Korean word " 나 ". Likewise, for each word, the user may receive feedback informing that "need" is the verb " 요구하다 " and "a car" is the noun " 자동차 ".

Thus, the user not conversant in English can receive the feedback information and thus determine whether the translation is consistent with his/her intention. Yet, when the translation into a third-world language, such as Chinese, Japanese, or French is required, the user can receive the feedback on the word class and the synonyms of the input word.

Figure 3:
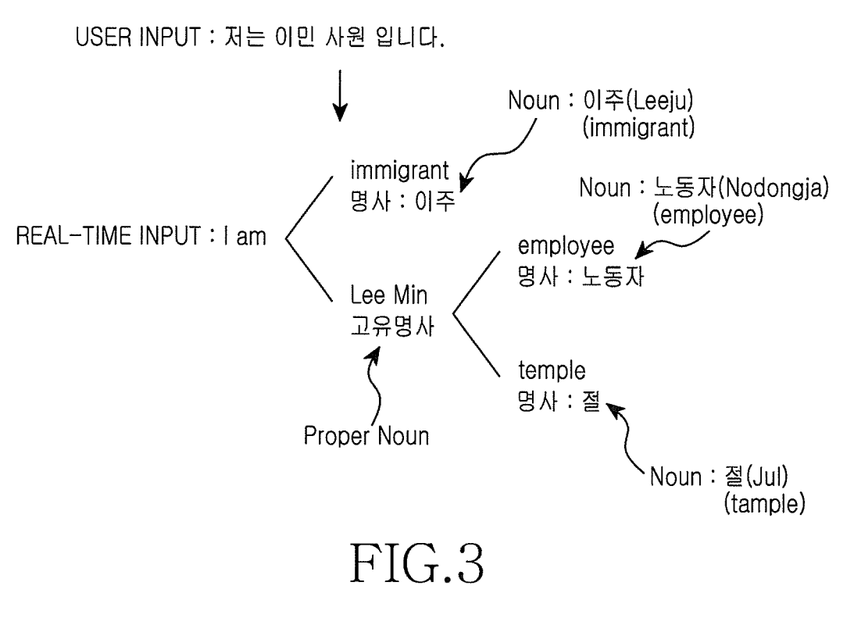
FIG. 3 illustrates an example translation tree structure in a translation method using the translation tree structure in the portable terminal according to an embodiment of the present invention.

FIG. 3 illustrates an example translation tree structure in a translation method using the translation tree structure in the portable terminal according to an embodiment of the present invention. Similar to FIG. 2, this example assumes that the Korean-speaking user wants to translate a particular Korean sentence into English. That is, the user knows the sentence in Korean but may not be able to translate it into English, or can roughly translate it into English but requires an accurate translation. As shown in FIG. 3, the user inputs the Korean sentence to be translated into English to the input part. Next, when the user inputs the command to change (translate) the inputted Korean words into English words, the user's intended sentence is automatically translated to English words. Words corresponding to the word class and the synonyms of the inputted words are displayed in the translation tree structure.

Specifically, when " 저는 이민 사원입니다 " is inputted, the inputted sentence is translated into English words using the DB pre-stored in the portable terminal. As a result, several sentences "I am immigrant employee", "I am Lee Min employee", and "I am Lee Min temple" are translated. That is, the related art translates the sentence " 저는 이민 사 원입니다 " uniformly to "I am immigrant employee". However, when the user intends to use the proper noun "Lee Min", not "immigrant", by the noun " 이민 ", the translation is incorrect. By contrast, using the pre-stored DB, the number of cases of the synonym of each word is displayed in the tree structure and thus the user can select the sentence including his/her intended proper noun "Lee Min".

Likewise, the word " 사원 " can be translated to different meanings including the noun "employee" and the noun "temple". That is, while the user wants to translate to the noun "employee", the mistranslation including the noun "temple" can be uniformly produced. By contrast, the user's intended "employee" can be selected by displaying "employee" and "temple" after "Lee MM" in the tree structure. While the tree structure is displayed only after "Lee Min" in FIG. 3 for clarification, the tree structure (not shown) is displayed after "immigrant".

Figure 4:
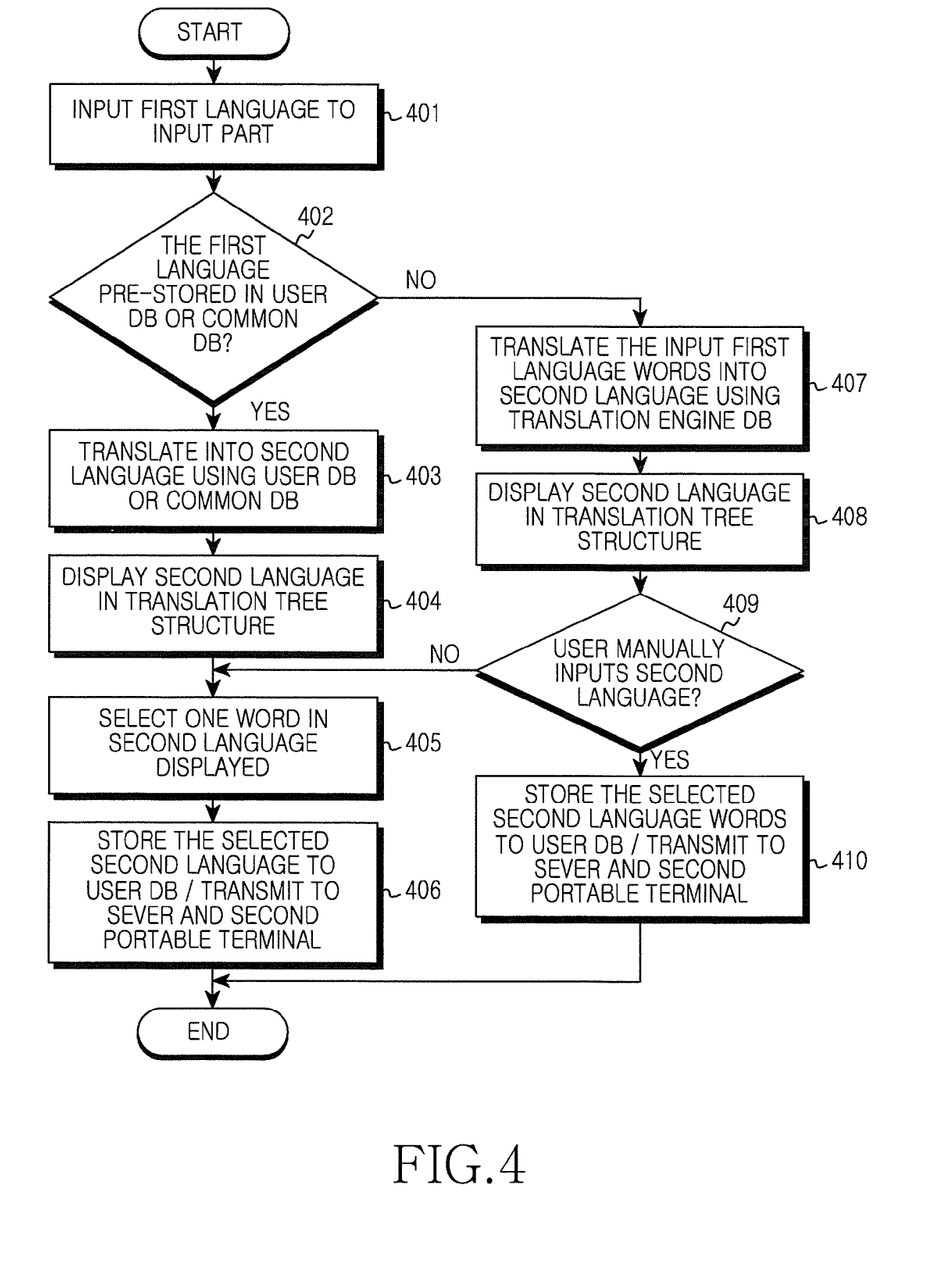
FIG. 4 illustrates an example method for selecting a translation using a pre-stored database according to an embodiment of the present invention.

FIG. 4 illustrates an example method for selecting a translation using the pre-stored DB according to an embodiment of the present invention. As shown in FIG. 4, the first language (the native language) to be translated is inputted to the input part in step 401. When the first language is inputted, the method determines whether the first language inputted is stored to the user DB or the common DB in step 402. When the first language inputted is pre-stored in step 402, the method translates into the second language using the user DB or the common DB in step 403.

The user DB collects and stores the data inputted by the user, and has the first priority in the translation. That is, the user DB stores data not registered in the existing DB, such as words frequently translated or new words. The first priority is given to enhance the user's convenience. The common DB is the pre-stored user DB in the server. The server receives, stores, and updates the user DBs from multiple users in real time. Meanwhile, the updated data is downloaded to the multiple users and stored to the common DB. The common DB has the second priority after the user DB in the translation.

When the translation uses the pre-stored DB, the translated second language is displayed in the translation tree structure in step 404. The translation tree structure marks the homonyms of the sentence of the first language input, together with their word class and meaning in the tree structure as explained above with regard to FIG. 3. When the translation tree structure is displayed, the user can select one of words of the second languages displayed in step 405. That is, various words translatable to the homonyms are displayed in the translation tree structure so as to select the word based on the ultimate sentence desired by the user. When the second language is selected in step 405, the method stores the selected second language words to the user DB and transmits the selected second language words to the server and the second portable terminal in step 406. Next, the translation selection using the pre-stored DB is finished.

However, when determining that the first language words inputted are not pre-stored to the user DB or the common DB in step 402, the method translates the first language words inputted into the second language using the translation engine DB in step 407. That is, when the first language words are not pre-stored in the user DB having the first priority and the common DB having the second priority, the first language is translated into the second language using the translation engine DB stored in the translation engine.

Next, the second language is displayed in the translation tree structure in step 408. When the displayed tree structure does not include the user's second language to translate, the method determines whether the user inputs the second language manually in step 409. When the user manually inputs the second language, the method stores the inputted second language words to the user DB and transmits it to the server and the second portable terminal in step 410. When the user does not directly input the second language words in step 409, the method selects any one of the most similar meaning in the displayed second language in step 405. That is, while there is no sentence or combination of words correctly translated in the displayed second language words, there is no big difference in terms of the meaning when the sentence, or the word mostly similarly translated is selected. After step 406, the translation selection using the pre-stored DB is finished.

Herein, the second portable terminal refers to the portable terminal receiving the translation. The present invention provides the automatic translation system and the translation revision function to be explained. In certain embodiments, the transmission of the selected word to the second portable terminal which communicates with the first portable terminal in step 406 can be omitted.

The method described above in relation with FIG. 4 under of the present invention may be provided as one or more instructions in one or more software modules, or computer programs stored in an electronic device including a portable terminal.

Figure 5:
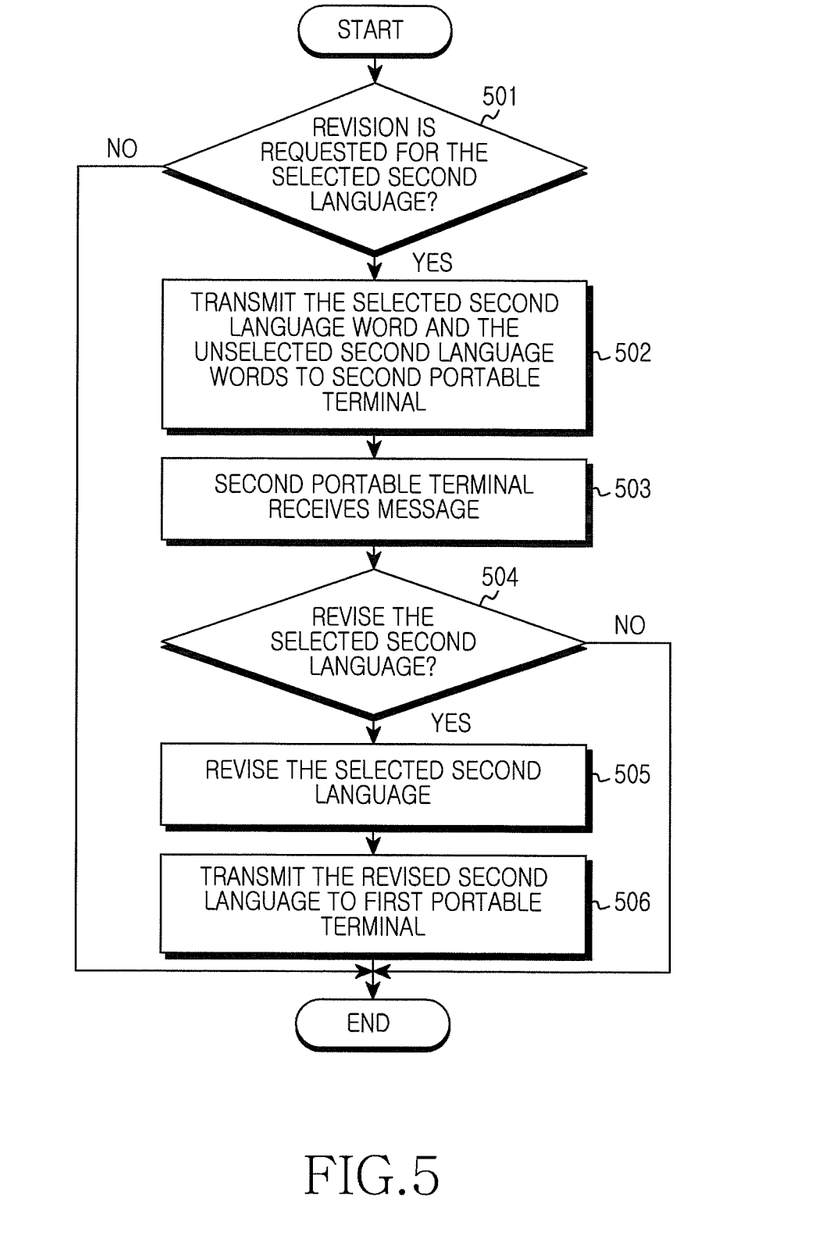
FIG. 5 illustrates an example translation revision function according to an embodiment of the present invention.

FIG. 5 illustrates an example translation revision function according to an embodiment of the present invention. In this particular example, it is assumed that the user speaking in the first language, of the first portable terminal is chatting with the user speaking in the second language, of the second portable terminal. As stated above in FIG. 4, the method determines whether or not to request the user of the second portable terminal to revise the selected second language in step 501. That is, when the user speaking in the first language is unsure about the translated sentence or word of the selected second language, he/she can request the revision by the user of the second portable terminal who speaks in the second language.

When the revision is requested in step 501, the method transmits the selected second language word and the unselected second language word to the second portable terminal in step 502. That is, all of the words displayed in the translation tree structure are transmitted to the other user together with the selected second language so that the other user can select the desired word or combination of words. Next, the second portable terminal using the second language receives a message in step 503 and obtains the selected sentence. That is, the recipient reads the selected sentence and determines whether the sentence is awkward or accurate in step 504.

When determining that the second language initially selected is awkward in step 504, the user selects the sentence or the word having a more accurate meaning based on the translation tree structure transmitted with the selected second language in step 505. Next, the method transmits the revised second language to the user of the first portable terminal which transmitted the second language in step 506. Although the repeated operation is omitted in FIG. 5, when the user of the first portable terminal determines that the revised second language is not the sentence or the word initially intended, the user feeds the revision back to the user of the second portable terminal and the revision check is repeated.

When the revision is not requested or the selected second language is sufficiently accurate, further processing at steps 501 and 504 are not performed and the translation revision function is finished.

The method described above in relation with FIG. 5 under of the present invention may be provided as one or more instructions in one or more software modules, or computer programs stored in an electronic device including a portable terminal.

Figure 6:
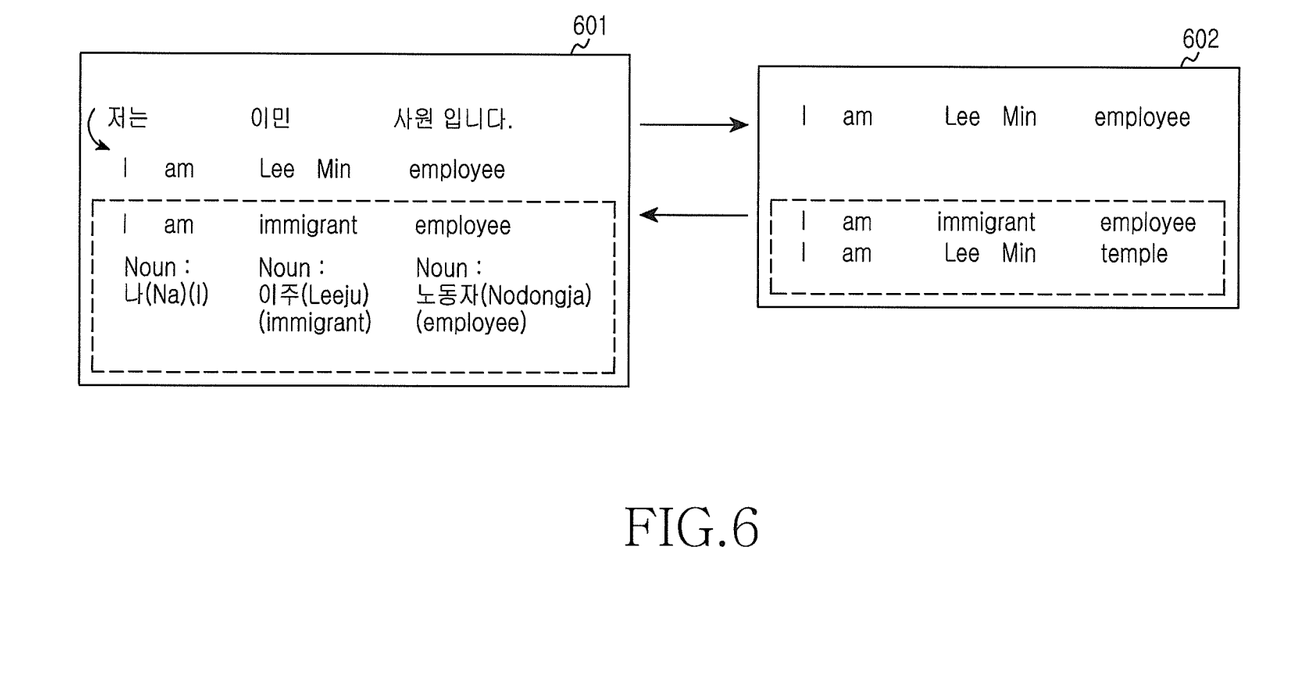
FIG. 6 illustrates an example translation revision function of a recipient according to an embodiment of the present invention.

FIG. 6 illustrates an example revision function of the recipient according to an embodiment of the present invention. As shown in FIG. 6, it is assumed that the user speaking in the first language, of the first portable terminal 601 is chatting with the user speaking in the second language, of the second portable terminal 602. At this time, the user of the first portable terminal 601 wants to translate the Korean sentence "저는 이민 사원입니다" into English in which the Korean sentence means 'the immigrant.' It is assumed that the sentence "저는 이민 사원입니다" input to the terminal is automatically translated to "I am Lee Min employee".

According to certain embodiments, all of the homonyms are displayed in the translation tree structure. When the word "immigrant" is used, the meaning of the immigrant employee desired by the user is completed. While the definite intention of the user can be confirmed in the embodiments of the present invention, it may be difficult to select the accurate sentence even in the translation tree structure, for example, when the meaning of the word or the sentence having various meanings differs. In this case, when the user selects "I am Lee Min employee" but is not sure about the translated sentence, the user can request the revision to the user of the second portable terminal 602.

Upon receiving the revision request, when the user of the second portable terminal 602 determines based on the context that the noun 'immigrant', not the proper noun 'Lee Min', is intended, he/she looks at the candidate translations displayed in the translation tree structure in the second portable terminal 602. Next, the user selects "I am immigrant employee" among the candidate translations and identifies again whether or not the user of the first portable terminal 601 intends to state "I am immigrant employee".

Advantageously, although the revision is not requested, when the awkward expression is determined based on the context, the user can select any one of the candidate translations and feed the selected translation back to the other user at any time.

Figure 7:
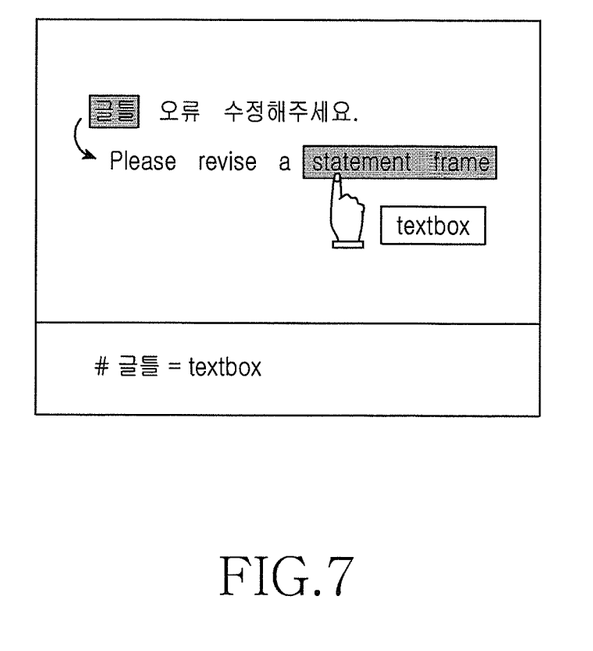
FIG. 7 illustrates an example translation word directly inputted by a user according to an embodiment of the present invention.

FIG. 7 illustrates an example translation word directly inputted by the user according to an embodiment of the present invention. In this example, it is assumed that the user wants to translate a sentence "글틀 오류 수 정해주세요" into English as shown in FIG. 7. When the user inputs the Korean sentence to the input part, the sentence is translated to "Please revise a statement frame". However, when the user does not like the translation "statement frame", the user can designate the block of the corresponding words, register a delimiter and a modified word to the input part, and thus revise to his/her intended word. For example, when a random delimiter '#', the word '글틀' is to be modified, and the word 'textbox' to be translated are inputted as "#글틀=textbox", 'statement frame' is deleted and 'textbox' is inputted instead. That is, "Please revise a statement frame" can be revised to "Please revise a textbox".

Also, the whole interpretation of the sentence in the previous conversation can be inputted with the modified word. For example, when "textbox" is input as "#글틀=textbox", 'statement frame' is deleted and 'textbox' is inputted instead in not only the past sentence but also the current sentence of the chatting window. That is, "Please revise a statement frame" can be revised to "Please revise a textbox" in all of the current and past sentences.

As above, the word registered by the user is stored to the user DB and the stored data is transmitted to the server. The server receives the transmitted data and automatically updates the data. Thus, the data updated in the server is downloaded to the multiple users and used as the highest priority in the translation.

Figure 8:
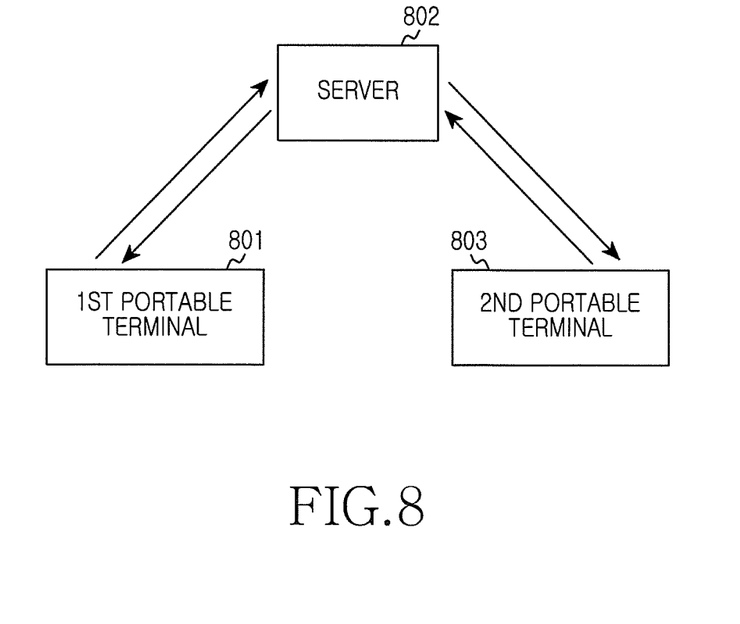
FIG. 8 illustrates an example personal database shared according to an embodiment of the present invention.

FIG. 8 illustrates an example personal DB shared according to an embodiment of the present invention. FIG. 8 shows relations between a first portable terminal 801, a second portable terminal 803, and a server 802. The first portable terminal 801 and the second portable terminal 803 can share the data stored in their user DB during a chatting session. The first portable terminal 801 and the second portable terminal 803 can transmit their user DB to the server 802. The server 802 receives and stores the user DB from multiple terminals, and automatically updates the data in real time. The data updated in the server 802 is downloaded to multiple users and used later as the highest priority in the translation.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for translation using a translation tree structure in a portable terminal, the method comprising:
    identifying, by an input portion of the portable terminal, a first text including a first source word and a second source word inputted in a first language into a message application;
    translating, by a translation engine, the first text into a second text in a second language, the second text including a first set of translation words corresponding to the first source word and a second set of translation words corresponding to the second source word, using a database of the portable terminal;
        wherein, when the first text including the first source word and the second source word is not pre-stored in the database of the portable terminal, translating the first text into the second text using a translation engine database;
    displaying, by an output portion of the portable terminal, the second text that is translated from the first text using the translation engine database including the first set and the second set in a message generated using the message application according to the translation tree structure,
        wherein the generated message comprises a plurality of homonyms in a sentence in the second language, and marking, by the translation tree structure, a word class of the displayed second text and a meaning of the first text in the tree structure, and
        wherein the translation tree structure comprises a structure in which each of the translation words of the second set is linked to one of the translation words of the first set dependently;
    transmitting, by the portable terminal, the message regarding the second text including the first set and the second set with a request to select one of the first set and one of the second set as a correct translation of the first text to a second portable terminal;
    selecting and storing the second text in the database of the second portable terminal; and
    transmitting the selected second text to at least one of a server and the portable terminal which uses the second language.

2. The method of claim 1, wherein the database comprises at least one of a user database pre-stored in the portable terminal and a common database downloaded from the server.

3. The method of claim 1, further comprising receiving a selection of the second text from the second portable terminal.

4. The method of claim 1, further comprising:
    receiving, at a server, the selected second text including the selected one of the first set and the selected one of the second set from the second portable terminal;
    storing the received second text; and
    updating the stored second text.

5. An apparatus configured to translate using a translation tree structure in a portable terminal, the apparatus comprising:
    an input portion of the portable terminal configured to identify a first text including a first source word and a second source word inputted in a first language into a message application;
    a translation engine configured to translate the first text into a second text in a second language, the second text including a first set of translation words corresponding to the first source word and a second set of translation words corresponding to the second source word, using a database of the portable terminal;
        wherein, when the first text including the first source word and the second source word is not pre-stored in the database of the portable terminal, the translation engine is configured to translate the first text into the second text using a translation engine database;
    a synonym/semantic database configured to mark homonyms in a sentence of the input first text together with a word class and meaning of the first text;
    an output portion of the portable terminal configured to display the second text that is translated from the first text using the translation engine database including the first set and the second set in a message generated using the message application according to the translation tree structure,
        wherein the synonym/semantic database is configured to send the homonyms to the output portion,
        wherein the generated message comprises the homonyms received by the output portion from the synonym/semantic database, and
        wherein the translation tree structure comprises a structure in which each of the translation words of the second set is linked to one of the translation words of the first set dependently;
    a communication module configured to:
        transmit the message regarding the second text including the first set and the second set with a request to select one of the first set and one of the second set as a correct translation of the first text to a second portable terminal;
        select and store the second text in the database of the second portable terminal; and
        transmit the selected second text to at least one of a server and the portable terminal which uses the second language.

6. The apparatus of claim 5, wherein:
    the communication module is further configured to transmit the second text to the server,
    wherein the database comprises at least one of a user database pre-stored to the portable terminal and a common database downloaded from the server.

7. The apparatus of claim 5, wherein the server is configured to receive the selected second text from the portable terminal, store the received second text, and update the stored second text.

8. The apparatus of claim 5, wherein the communication module is further configured to receive a selection of second text from the second portable terminal.

9. A non-transitory computer readable medium comprising code that, when executed by a processor, causes a portable terminal to:
> identify, by an input portion of the portable terminal, a first text including a first source word and a second source word inputted in a first language;
> translate, by a translation engine and using a translation tree structure in the portable terminal, the first text into a second text in a second language, the second text including a first set of translation words corresponding to the first source word and a second set of translation words corresponding to the second source word, using a database of the portable terminal;
>> wherein, when the first text including the first source word and the second source word is not pre-stored in the database of the portable terminal, translate the first text into the second text using a translation engine database;
> display, using an outlet portion of the portable terminal, the second text that is translated from the first text using the translation engine database including the first set and the second set in a message generated using a message application according to the translation tree structure,
>> wherein the generated message comprises a plurality of homonyms in a sentence in the second language, and marking, by the translation tree structure, a word class of the displayed second text and a meaning of the first text in the tree structure, and
>> wherein the translation tree structure comprises a structure in which each of the translation words of the second set is linked to one of the translation words of the first set dependently;
> transmit the message regarding the second text including the first set and the second set with a request to select one of the first set and one of the second set as a correct translation of the first text to a second portable terminal;
> select and store the second text in the database of the second portable terminal; and
> transmit the selected second text to at least one of a server and the portable terminal which uses the second language.

10. The computer readable medium of claim 9, further comprising code that, when executed by a processor, causes the portable terminal to receive a selection of the second text from the second portable terminal.

11. The computer readable medium of claim 10, further comprising code that, when executed by a processor, causes the portable terminal to store the received second text, and update the stored second text.

\* \* \* \* \*